United States Patent
Ling et al.

(10) Patent No.: US 8,761,735 B2
(45) Date of Patent: Jun. 24, 2014

(54) AUTHENTICATING IDENTITY OF CALLER

(75) Inventors: Jin Ling, Beijing (CN); Yin Ben Xia, Beijing (CN); Zhe Xiang, Beijing (CN); Chun Ying, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/431,820

(22) Filed: Apr. 29, 2009

(65) Prior Publication Data

US 2009/0270073 A1    Oct. 29, 2009

(30) Foreign Application Priority Data

Apr. 29, 2008   (CN) .......................... 2008 1 0095592

(51) Int. Cl.
| | |
|---|---|
| H04W 4/00 | (2009.01) |
| H04M 1/56 | (2006.01) |
| H04M 1/57 | (2006.01) |
| H04M 3/42 | (2006.01) |
| H04W 4/14 | (2009.01) |

(52) U.S. Cl.
CPC ............ *H04M 1/57* (2013.01); *H04M 3/42025* (2013.01); *H04W 4/14* (2013.01)
USPC .................. 455/414.1; 455/461; 379/142.06

(58) Field of Classification Search
CPC ....... H04W 12/06; H04W 4/14; H04W 15/16; H04W 8/02; H04M 17/205–17/206; H04M 2017/243–2017/246; H04M 1/57; H04M 3/42025–3/42093
USPC .............. 455/415, 411, 414.1, 433, 461, 432, 455/435; 379/142.06
See application file for complete search history.

(56) References Cited

U.S. PATENT DOCUMENTS

| | | | | |
|---|---|---|---|---|
| 6,154,531 | A * | 11/2000 | Clapper | 379/142.14 |
| 6,226,367 | B1 * | 5/2001 | Smith et al. | 379/142.04 |
| 6,600,923 | B1 * | 7/2003 | Dzuban | 455/433 |
| 7,027,581 | B1 * | 4/2006 | Kalmanek et al. | 379/219 |
| 7,177,627 | B2 * | 2/2007 | Melaku et al. | 455/414.1 |
| 7,489,770 | B2 * | 2/2009 | Nemoto et al. | 379/142.07 |
| 7,623,849 | B2 * | 11/2009 | Zellner | 455/415 |
| 7,929,675 | B2 * | 4/2011 | Ruckart | 379/142.06 |
| 7,945,253 | B2 * | 5/2011 | Zellner | 455/415 |

FOREIGN PATENT DOCUMENTS

| | | |
|---|---|---|
| EP | 0873032 A1 | 10/1998 |
| EP | 1211875 B1 | 6/2002 |

* cited by examiner

*Primary Examiner* — Nizar Sivji
(74) *Attorney, Agent, or Firm* — Cantor Colburn LLP

(57) ABSTRACT

A method, apparatus, system, and computer readable medium for authenticating the identity of a caller. An authentication device authenticates a caller's identity based on received information of the caller and an identifier generation device generates an identifier containing the caller's identity. The authentication information is supplied to a mobile telephone user acting as a callee. Therefore, the callee knows the caller's identity, thereby providing a secure delivering channel.

9 Claims, 4 Drawing Sheets

AUTHENTICATING IDENTITY OF CALLER

CROSS-REFERENCE TO RELATED APPLICATION

This application claims priority under 35 U.S.C. §119(a) from Chinese Patent Application No. 200810095592.4 filed Apr. 29, 2008, the entire contents of which are incorporated herein by reference

BACKGROUND OF THE INVENTION

1. Field of the Invention

The present invention relates to a method, apparatus, system, and computer readable medium for authenticating a caller's identity.

2. Description of the Related Art

It is known that there are some cheating issues by means of mobile telephone today. For example, someone professing to be from the Government Tax department may call a mobile telephone user and tell him that he can be refunded his tax after the payment of a fee. Many people are cheated by not checking to determine whether the call is really coming from the declared department. Thus, to a large degree, the success of such mobile telephone cheating may be attributed to the fact that the mobile telephone user can not identify the caller's true identity.

In general, in addition to recognizing whether the caller is an acquaintance by his voice, a user may recognize the caller's identity in the following manners:

(1) If the incoming number has been stored in the mobile telephone directory, when a call comes in, the mobile telephone will look for the number and show the name of the caller. Thus, the mobile telephone will recognize the caller's identity; or (2) If the calling number is a well-known number, such as 911, even if it is not stored in the directory, the user may recognize it.

However, in many situations, the mobile telephone user cannot recognize the caller's identity. For example, in the above case, if the caller is a stranger whose number is not stored in the directory, and the user himself is not familiar with the call number, the user cannot recognize the identity of the caller in time. So, it is desired to recognize/authenticate the caller's identity within a reasonable period of time after the call begins.

FIG. 1 shows a call from a fixed telephone user to a mobile telephone user in the prior art. As shown in FIG. 1, a call from a fixed telephone user (caller) 101 is transmitted to the Gateway Mobile Switching Center (GMSC) 104 of the communication network 102 through the Public Switching Telephone Network (PSTN, not shown). It is recognized in the routing gateway of the GMSC 104 that the calling number is a mobile telephone number. The Mobile Switching Center (MSC) 107 then checks the Home Location Register (HLR) 105 for the identity information about the callee 103. By means of the information stored in the HLR 105, in combination with the information stored in the Visitor Location Register (VLR) 106, the MSC 107 can derive information about the callee 103. After several routings among the Signal Transform Point (STP, not shown), MSC 107 and Base Station Controller (BSC) 108, the call signal will be sent to the callee 103, and the calling ring is started.

However, it can be seen from the prior art shown in FIG. 1 that the currently used communication system does not provide a process for authenticating the incoming call number.

SUMMARY OF THE INVENTION

In view of the above problems existing in the prior art, the present invention provides a method, apparatus, system, and computer readable medium for authenticating the caller's identity.

According to an aspect of the invention, a method for authenticating the identity of a caller is provided. The method authenticates the identity of a caller based on received information about the caller and generates an identifier containing the caller's identity based on the authentication result. The result is supplied to a mobile telephone user acting as a callee.

According to another aspect of the invention, an apparatus for authenticating the identity of a caller is provided. The apparatus includes an authentication means for authenticating the identity of the caller, based on received information about the caller. An identifier generation means generates an identifier containing the identity of the caller and supplies the identity to a mobile telephone user acting as a callee, based on the result of the authentication.

According to still another aspect of this invention, a telecommunication system is provided authenticating the identity of a caller. The telecommunication system includes an authentication means for authenticating the identity of the caller, based on received information about the caller. An identifier generation means generates an identifier containing the identity of the caller and supplies the identity to a mobile telephone user acting as a callee, based on the result of the authentication.

According to further aspect of the present invention, an article of manufacture is provided embodying computer readable instructions, which when executed, causes a computer to carry out the method steps for authenticating the identity of a caller.

The method authenticates the identity of the caller based on received information about the caller.

Additionally, an identifier containing the caller's identity is generated and provided to a mobile telephone user acting as a callee based on the authentication result.

DETAILED DESCRIPTION OF THE PREFERRED EMBODIMENTS

In general, where features are described herein with reference to an embodiment of one aspect of the invention, corresponding features may be provided in embodiments of another aspect of the invention as appropriate.

According to the present invention in the case that the existing communication standards is complied, the caller's identity is authenticated, and authentication information containing the caller's ID is sent to the mobile telephone user acting as callee, to make the callee know the caller's identity, thereby a security information delivering channel can be provided.

The detailed description of the various features for authenticating the caller's identity according to embodiments of the present invention will be given with reference to the drawings and in combination with specific embodiments below.

Figure 1:
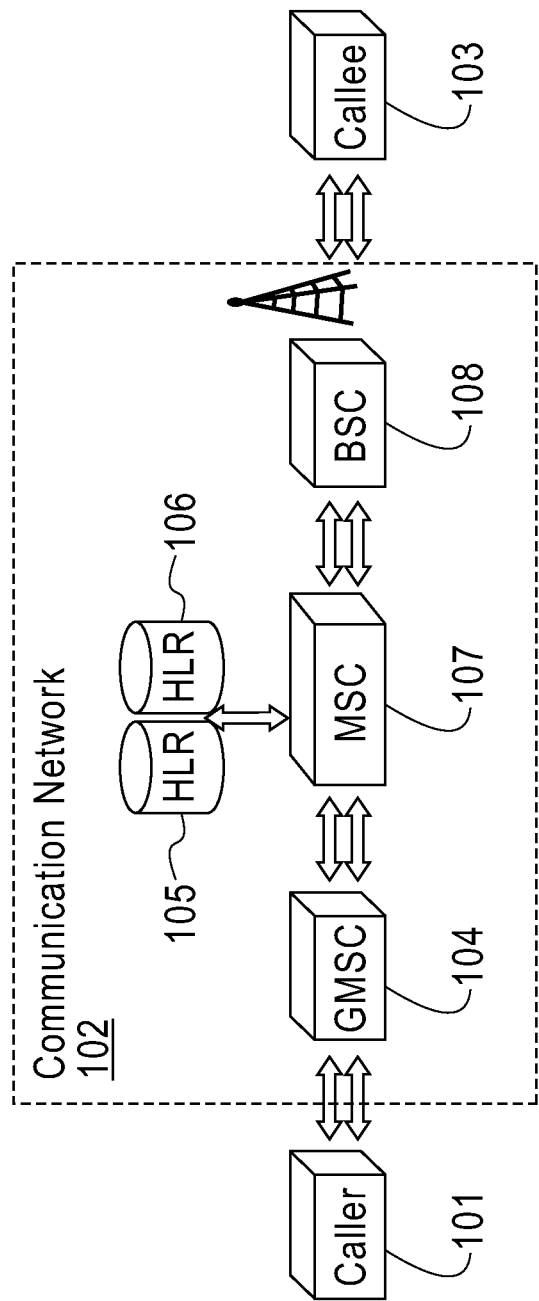
FIG. 1 is a view showing a call from a fixed telephone user to a mobile telephone user in the prior art.
Figure 2:
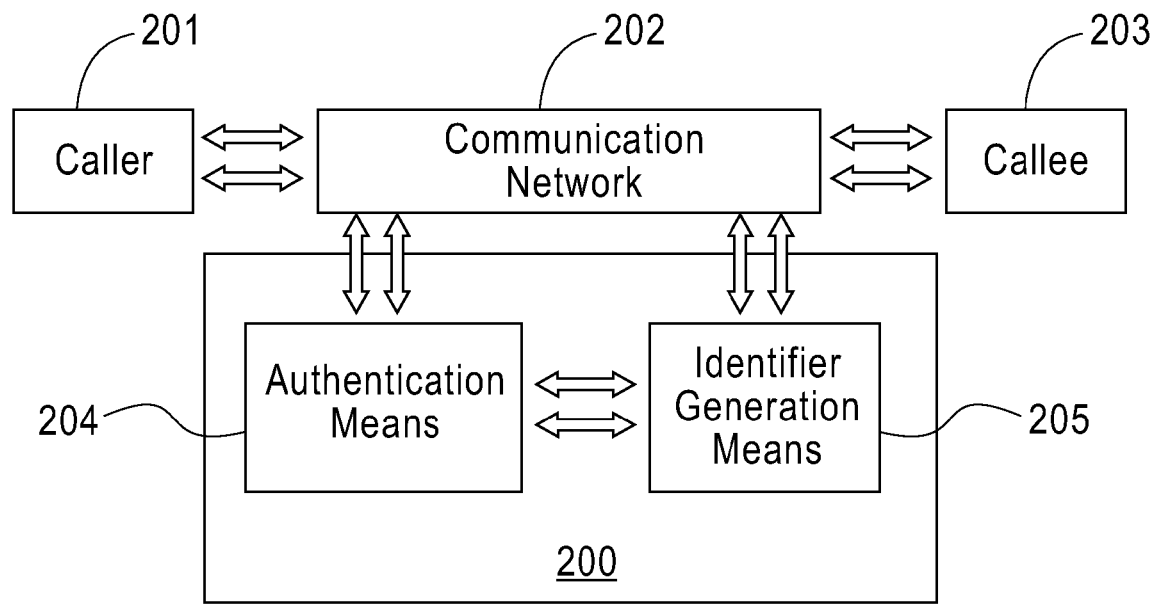
FIG. 2 is block diagram of an apparatus for authenticating the identity of the caller according to an aspect of the present invention.

FIG. 2 is a block diagram of the apparatus for authenticating the identity of the caller according to one embodiment of the present invention. As shown in FIG. 2, an authentication apparatus 200 for authenticating the caller's identity comprises an authentication means 204 and an identifier generation means 205. A call from the caller 201 is received in communication network 202 and a connection between the caller 201 and callee 203 is established. Based on information about the caller 201 received from the communication network 202, the authentication means 204 authenticates the identity of the caller 201. The identifier generation means 205 generates an identifier containing the caller's identity according to the authentication result of the authentication means 204, and then transmits the identifier to the mobile telephone user acting as callee 203 through the communication network 202.

In various embodiments of the present invention, the authentication means and the identifier generation means can be implemented in software, hardware, firmware or combination thereof, and the connections there between may be achieved by interface with an existing telecommunication system.

In the authentication apparatus 200 shown in FIG. 2, the authentication means 204 can authenticate the caller 201's identity based on the information corresponding to the telephone number of caller 201 pre-stored therein. The information can be for example the name of caller 201, or credit information of caller 201. For example, the credit information is information about the credit level of caller 201. According to an embodiment of the invention, the caller's number and corresponding information can be pre-stored in a database (not shown) to be retrieved by the authentication means 204.

According to another embodiment of the invention, when the caller makes a call to the callee, an additional code, such as a prefix number, account and password of the caller, can be added to the calling number to be delivered.

The authentication means 204 may authenticate the caller's identity and provide the authentication result to the callee by using pre-stored information about the additional code, and checking the prefix number or the account and password.

Further, by retrieving the database, the pre-stored telephone number of the authenticated caller can be converted into a corresponding name to be supplied to the callee.

In another embodiment of the invention, the caller's identity can also be authenticated based on the credit level. For example, by defining the caller with a higher credit level as a legal user and the caller with a lower credit level as an illegal user, the callee can be supplied with an identifier containing the authentication result.

In a further embodiment of the invention, the callee may also be supplied with the name and the credit level of the authenticated caller simultaneously.

The identifier containing the caller's 201 identity generated by the identifier generation means 205 can be supplied to the callee 203 in the form of a wireless application protocol such as Short Message Service (SMS) or USSD (Unstructured Supplementary Service Data) message. Further, the caller 201 can be a fixed telephone user or a mobile telephone user.

Figure 3:
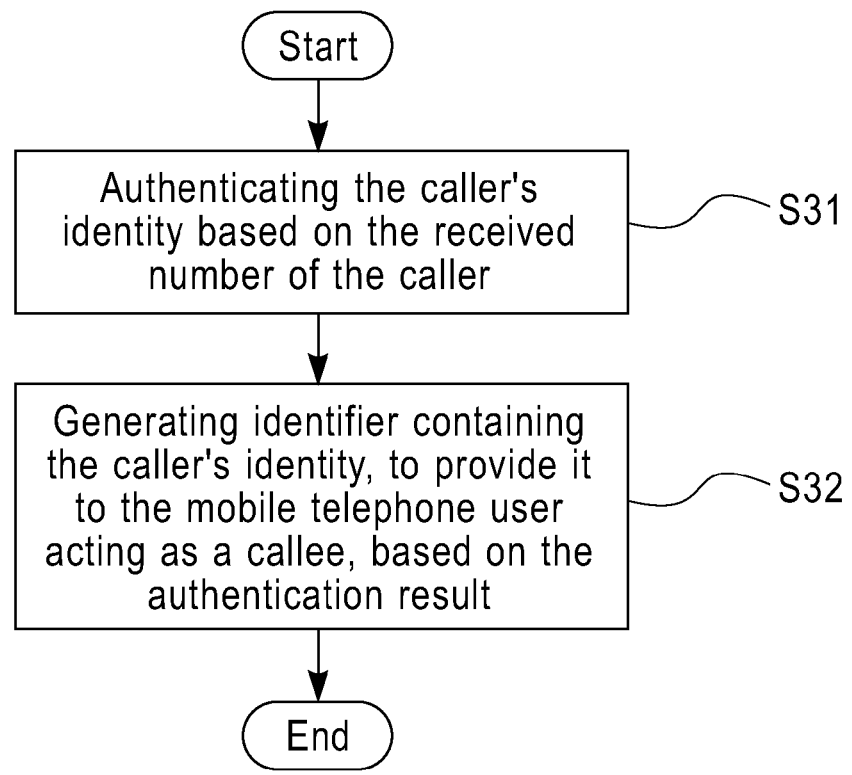
FIG. 3 is a flowchart of a method for authenticating the identity of the caller according to an aspect of the present invention.

FIG. 3 is a flowchart of a method for authenticating the caller's identity according an embodiment of the present invention. As shown in FIG. 3, at step S31, based on the received information about the caller, the caller's identity is authenticated. At step S32, according to the authentication result, an identifier containing the caller's identity is generated and sent to the mobile telephone user acting as callee, so that the callee is aware of the caller's identity.

As shown in FIG. 3, the caller's identity can be authenticated based on pre-stored information corresponding to the telephone number of the caller, for example, by means of the authentication means as shown in FIG. 2. For example the information can be the name of the caller or credit information of the caller and the credit information can be credit level information about the caller. According to one embodiment of the invention, the caller's telephone number and its corresponding information are pre-stored in a database (not shown) to be retrieved by the authentication means.

Next, a description on how to authenticate identity of a service provider in a telecommunication system will be given with reference to the drawings.

Figure 4:
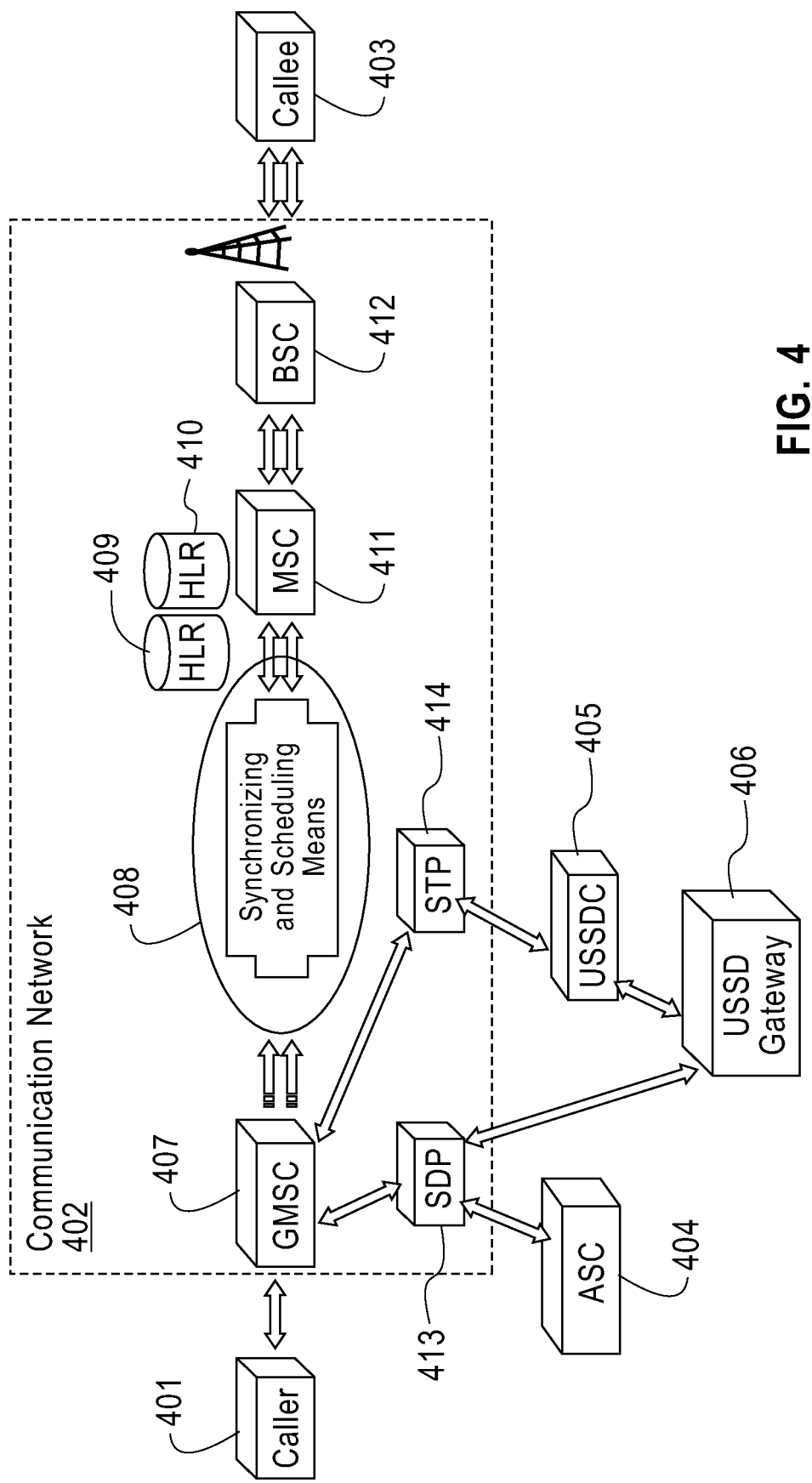
FIG. 4 is a block diagram of a telecommunication system for authenticating telecommunication service according to an aspect of the present invention.

FIG. 4 is a block diagram of the telecommunication system for authenticating the identity of a telecommunication service provider according to one embodiment of the present invention.

As shown in FIG. 4, a telecommunication system capable of authenticating the telecommunication service provider's identity includes a caller 401, a telecommunication network 402, a callee 403, an authentication service center (ASC) 404, an unstructured supplementary service data (USSD) gateway 406 and an USSD center (USSDC) 405. The telecommunication network 402 includes GMSC 407, HLR 409, VLR 410, MSC 411, BSC 412, service delivery platform (SDP) 413 and STP 414. The SDP 413 is used as a platform delivering services among ASC 404, USSD gateway 406 and GMSC 407, STP 414 is used to deliver the USSD message generated by the USSDC 405 to GMSC 407 for transmission to the callee.

In an embodiment of the telecommunication system of the present invention, the caller 401 is a telecommunication service provider, which may provide telecommunication service by a fixed telephone to a mobile telephone user, i.e., the callee 403, through the telecommunication network 402. The ASC 404 can be used as the authentication means for authenticating the caller 401's identity, and the USSD gateway 406 and the USSDC 405 can be used as the identifier generation means to generate an identifier containing the caller 401's ID for providing to the callee 403. In another embodiment of the invention, separate authentication means and identifier generation means can also be used.

Further, the telecommunication system can include synchronizing and scheduling means 408 connected between the GMSC 407 and the MSC 411, which is used to synchronize the telephone number of the caller 401 to the generated USSD message, and send the synchronized telephone and the USSD message to the callee 403 via the MSC 411.

It is noted that, the ASC 404, the USSDC 405, the USSD gateway 406, the SDP 413 and the STP 414 can implement signal interaction between each other through existing interfaces. Moreover, the synchronizing and scheduling means 408 may also interconnect to the GMSC 407 and the MSC 411 through existing interfaces.

It is known that, in prior art a process for initiating a call from a fixed telephone caller to a mobile telephone user includes the following operations:

(1) The caller 401 sends a call to the GMSC 407 through a public switching telephone network (PSTN, not shown);

(2) The calling number is determined as a mobile telephone number in the routing gateway of the GMSC 407;

(3) The mobile switching center (MSC) 411 first checks the HLR 409 of the core network, to authenticate the identity information of the caller 403. The MSC 411 identifies the information about the caller 403 by means of information stored in the HLR 409 in combination with information stored in the VLP 410;

(4) Based on the known information about the caller 403, the MSC 411 sends a Base Station Sub-system Application Protocol (BSSMAP) paging message, to connect the base station the callee 403 belongs to;

(5) The base station sends a paging request to the callee 403;

(6) If the callee 403 is available, the callee 403 gives a traffic channel request to reserve a traffic channel on the base station side; and (7) The connection between the caller 401 and the callee 403 is established.

According to one embodiment of the invention, before the operation (7), i.e., before the establishment of the connection between the caller 401 and the callee 403, the received caller 401's identity is authenticated by the authentication means, and then the authentication result is sent to the identifier generation means which generates a USSD message containing the caller 401's identity. Further, the USSD message and the telephone number are sent to the callee 403 at the same time, thereby the USSD message is sent to the callee 403 while the connection between the caller 401 and the callee 403 is established.

Figure 5:
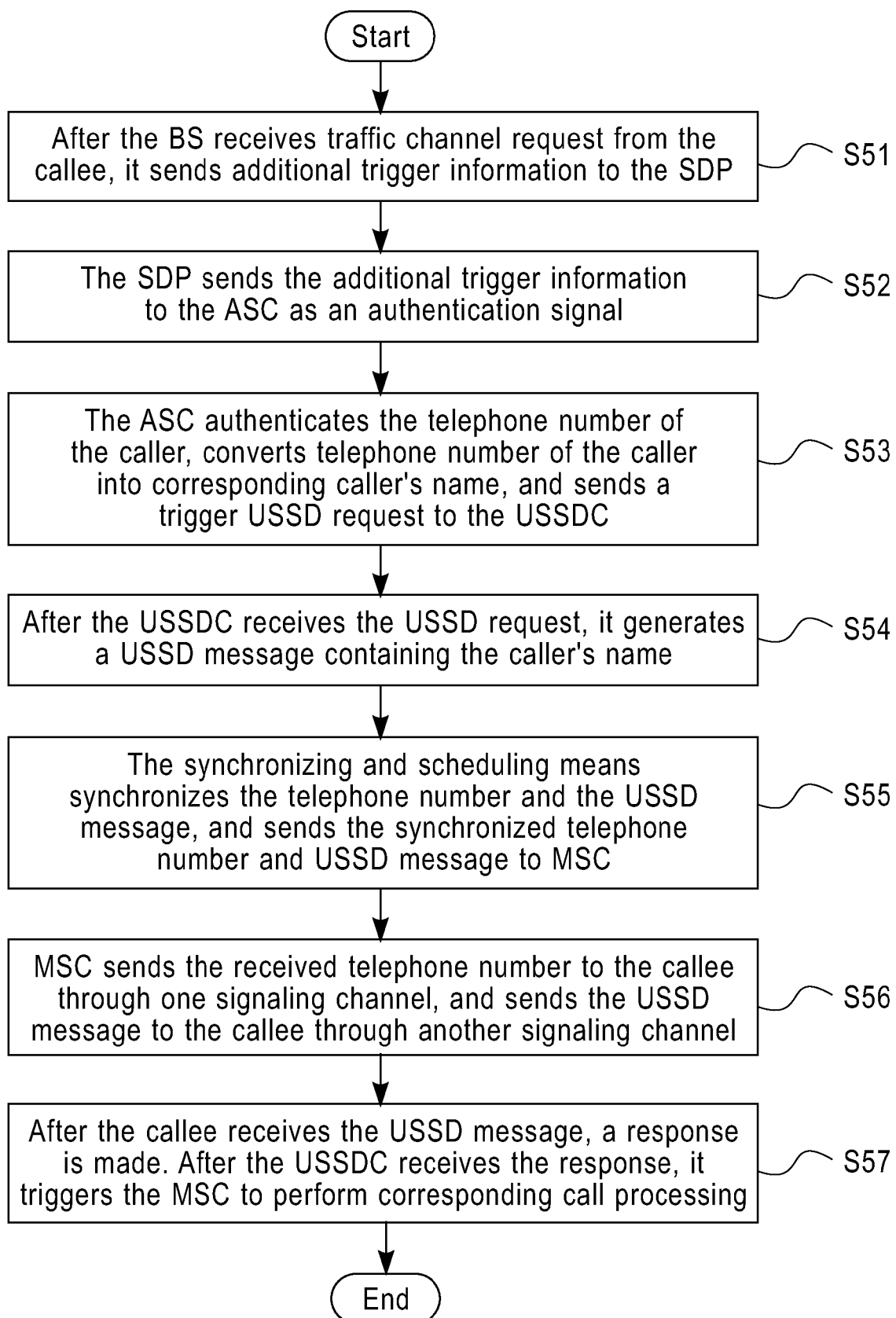
FIG. 5 is a flowchart of a method for authenticating telecommunication services according to an aspect of the present invention.

FIG. 5 is a flowchart of a method for authenticating a telecommunication service according to an embodiment of the present invention.

As shown in FIG. 5, at step S51, after the BBS receives the traffic channel request from the callee 403, additional trigger information is sent to the SDP 413. At step S52, the SDP 413 sends the additional trigger information as an authentication signal to the ASC 404, to trigger the authentication on the caller 401 performed by the ASC 404. At step S53, after the ASC 404 retrieves the pre-stored name of the caller 401, it converts the telephone number of the caller 401 into the corresponding caller's name, and triggers another USSD request to the USSDC 405.

According to this embodiment, the ASC 404 can contain a database in which the caller 401's service number and its corresponding name are stored in advance. Thereby, the ASC 404 may authenticate the caller 401 based on the content stored in the database. The caller 401 can be a department providing service to public, such as a tax department, a bank, a telecommunication service provider, etc. At step S54, after receiving the USSD request, the USSDC 405 generates a USSD message containing the caller's name.

Compared to the SMS service often used in the prior art, the USSD service used in this invention is more rapid and has a higher message arrival rate. In general, a USSD message can arrive at the user's terminal while the mobile telephone is ringing.

The USSD service platform includes the USSD gateway 406 and the USSD center 405. The USSDC 405 connects to the telecommunication network 402 by means of the Mobile Application Part (MAP of No. 7 signaling. The USSD gateway 406 connects to the USSDC 405 through Transfer Control protocol/Internet protocol (TCP/IP) on one side and connects to the dedicated line of each application center through Internet on the other side. The USSD service platform is adapted to provide services to mobile users, adding some new service types, the original telecommunication system is almost unchanged and its stability can be retained also.

At step S55, the synchronizing and scheduling means 408 synchronizes the caller's telephone number to the USSD message, and then sends the synchronized caller's telephone number and USSD message to the MSC 411. At step S56, the MSC 411 sends the received telephone number to the callee 403 through one signaling channel via the No. 7 signaling system, and sends the USSD message through another signaling channel to the callee 403 via the No. 7 signaling system.

At step S57, after the callee 403 receives the USSD message, a response is sent to the USSDC 405. When the USSDC 405 receives the response from the callee 403, it triggers the MSC 411 to perform corresponding call processing.

According to this embodiment, the caller 401's number is received on the mobile station (MS) of the callee 403, and the text USSD message is also displayed on the screen of the MS to notify the caller 401's identity to the MS's user. The callee 403 can accept or reject the USSD message. For example, the USSD message can be accepted or rejected by turning on or off the MS directly. As a text message, the USSD message may include multiple menu options. Accordingly, the callee 403 can accept or reject the USSD message by selecting corresponding menu options of the USSD message. If the callee 403 makes a response to accept some menu options, when the USSDC 405 receives the response, it will provide corresponding service to the callee 403 via the MSC 411.

It can be seen from the flowchart of FIG. 5, it is helpful to make the callee 403 recognize the caller 401's identity in real time by sending the service provider's telephone number through one signaling channel, and by sending a USSD message containing the service provider's name through another channel, and by enabling the telephone number and the USSD message arrive at the MS of callee 403 at the same time. Additionally, it is also possible for the callee 403 to select value-added services provided in the USSD message.

In the above-described embodiments, a USSD message is used to deliver the information about the caller 401's identity to the callee 403. In other embodiments of the invention, a SMS message, instead of the USSD message, can be used to deliver the information about the caller 401's identity, which can be achieved by the existing SMS message generating and sending mechanism.

Exemplary embodiments on how to authenticate the telecommunication service provided from a provider using fixed telephone to a mobile telephone user have been described above. Based on the technical teachings as disclosed herein above, those skilled in the art would also be able to authenticate the telecommunication service provided from a provider using mobile telephone to a mobile telephone user, without departing from the scope of the present invention. For instance, the authentication means and the identifier generation means may be located in the MSC of the mobile communication system, or alternatively, it is also possible to implement this invention by providing separate authentication means and identifier generation means.

It can be understood from the content as disclosed above that it is possible to add the authentication means and the identifier generation means into the existing telecommunication system, to authenticate the caller's identity and send authentication information containing the caller's identity to the callee, thereby the callee can be aware of the caller's identity.

Although some embodiments of the invention have been described as above, those skilled in the art may make various modifies to this invention without departing from the essential concept of this invention, which should fall into the protection scope as defined by the appended claims of the present invention.

We claim:

1. A method for authenticating the identity of a caller, the method comprising:
   receiving trigger information including the telephone number of a caller responsive to a base station having received a traffic channel request from a mobile telephone of a callee;
   retrieving the identity of the caller based on the telephone number of the caller;
   authenticating the identity of the caller based on an additional code corresponding to the caller;
   generating an unstructured supplementary service data (USSD) message including the retrieved identity of the caller;
   synchronizing the telephone number with the USSD message;
   sending the telephone number to the mobile telephone through a first signaling channel; and
   sending the USSD message to the mobile telephone through a second signaling channel, wherein the telephone number and USSD message are enabled to arrive at the mobile telephone approximately at the same time.

2. The method according to claim 1, wherein the identity of the caller is retrieved from a database containing information about the caller including the identity and the telephone number of the caller.

3. The method according to claim 2, wherein the information about the caller includes the telephone number and the name of the caller, and the retrieved identity of the caller includes the name of the caller.

4. The method according to claim 1, wherein the telephone number and the USSD message are sent to mobile telephone while the telephone connection between the caller and the callee is established.

5. A telecommunication system comprising an authentication device for authenticating the identity of a caller, the authentication device comprising:
   an authentication means for receiving trigger information including the telephone number of the caller responsive to a base station having received a traffic channel request from a mobile telephone of a callee, retrieving the identity of the caller based on the telephone number of the caller and authenticating the identity of the caller based on an additional code corresponding to the caller;
   an unstructured supplementary service data (USSD) means for generating an USSD message including the retrieved identity of the caller;
   synchronizing and scheduling means for synchronizing the telephone number with the USSD message; and
   a service delivery means for sending the telephone number to the mobile telephone through a first signaling channel, and sending the USSD message to the mobile telephone through a second signaling channel, wherein the telephone number and USSD message are enabled to arrive at the mobile telephone approximately at the same time.

6. The telecommunication system according to claim 5, further comprising:
   storage means for storing information about the caller including the identity and the telephone number of the caller, wherein the authentication means retrieves the identity of the caller from the storage means.

7. The telecommunication system according to claim 6, wherein the information about the caller includes the telephone number and the name of the caller, and the retrieved identity of the caller includes the name of the caller.

8. The telecommunication system according to claim 6, wherein the information about the caller includes the telephone number and an additional code corresponding to the caller, and the authenticating means further authenticates the identity of the caller based on the additional code.

9. An article of manufacture tangibly embodying non-transitory computer readable instructions, which when executed, cause a computer to carry out the method steps for authenticating the identity of a caller, the method comprising:
   receiving trigger information including the telephone number of a caller responsive to a base station having received a traffic channel request from a mobile telephone of a callee;
   retrieving the identity of the caller based on the telephone number of the caller;
   authenticating the identity of the caller based on an additional code corresponding to the caller;
   generating an unstructured supplementary service data (USSD) message including the retrieved identity of the caller;
   synchronizing the telephone number with the USSD message;
   sending the telephone number to the mobile telephone through a first signaling channel; and
   sending the USSD message to the mobile telephone through a second signaling channel, wherein the telephone number and USSD message are enabled to arrive at the mobile telephone approximately at the same time.

* * * * *